Patented Nov. 26, 1940

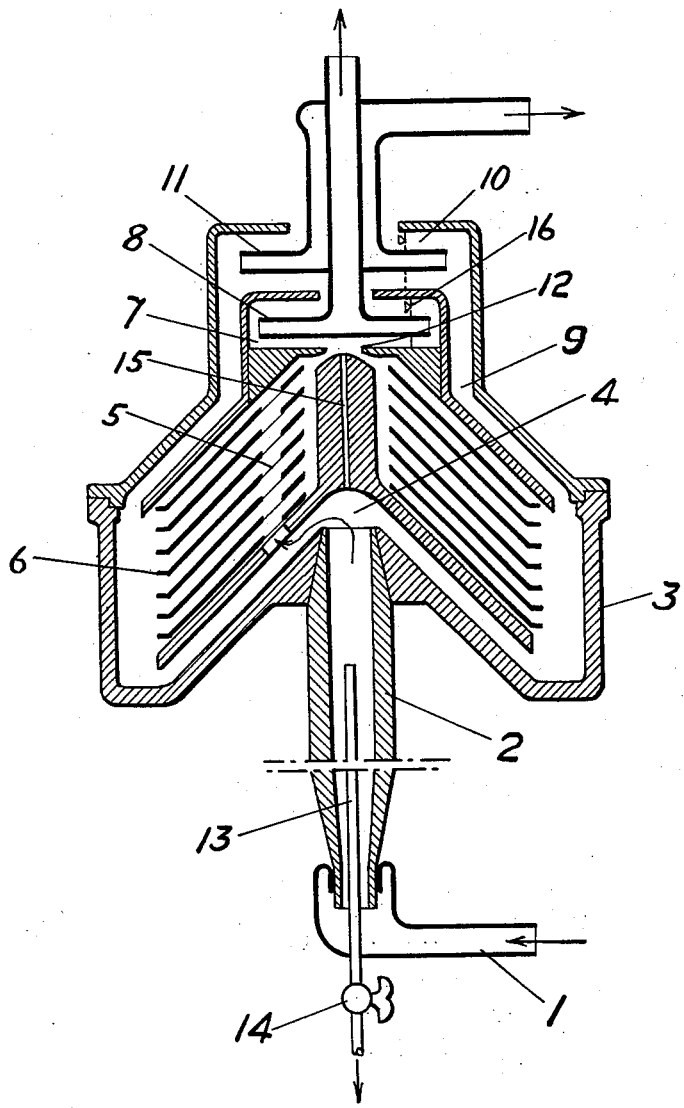

2,222,727

UNITED STATES PATENT OFFICE 2,222,727

PROCESS OF EFFECTING CLEAN SKIMMING IN SEPARATING MILK FROM CREAM AND IN CENTRIFUGES FOR PRACTICING SUCH METHOD

Alf Lennart Stigen, Stockholm, Sweden, assignor to The De Laval Separator Company, New York, N. Y., a corporation of New Jersey Application November 9, 1938, Serial No. 239,660 In Germany November 12, 1937

10 Claims. (Cl. 233—22)

In the centrifugal separation of liquids of different specific gravities, and particularly in the separation of skim milk and cream from whole milk, tests have shown that it is necessary, in order to effect maximum clean skimming, to avoid breaking up of fat globules in the course of the feed to the separator bowl and to prevent the formation in the central or inner part of the bowl of a zone filled with air. This object has been largely attained in the so-called "closed" or air-tight separator, but has not been attained in the older type of centrifuges or in those later developed centrifuges provided with "parers," the last named centrifuges comprising an auxiliary chamber or chambers rotating with the bowl and from which the separated liquid or liquids is or are withdrawn by means of a stationary outflow channel or channels, preferably of the disc type. Such centrifuges possess certain recognized advantages. It is the object of the invention to provide a centrifuge of this type which is maintained entirely filled with liquid, which is adapted to effect clean skimming and which is devoid of packings or seals between rotary and stationary parts of the centrifuge, which seals, although undesirable, have been found necessary in most bowls of this type.

My invention comprises, as a method, a novel combination of steps, and, as a machine, a novel combination of elements, which have been found to make possible the attainment of the above objects.

The figure is a sectional elevation of a centrifuge embodying my invention and in which my improved process is adapted to be practiced.

The whole milk is fed through a fixed conduit 1 into a hollow bowl spindle 2 supporting a centrifugal bowl 3. From the feed chamber 4 in the central part of the bowl the milk flows in the direction of the arrow into distributing channels 5 in the disc set 6. The cream flows into a paring chamber 7 from which it is withdrawn by a stationary paring disc 8. The skim milk is led through channels 9 into a paring chamber 10 from which it is withdrawn by a paring disc 11. The cream from the separating chamber flows over an edge overflow 12 between the separating chamber and the cream paring chamber 7. Such edge overflow must be at a distance from the axis of the bowl not substantially greater than the distance from such axis to the inner wall of the annular separating chamber. The paring chamber 7 must extend such radial distance from the bowl that the liquid level 16 therein is maintained at a substantially greater distance from the separator's axis of rotation than the inner wall of the separating channel and the overflow edge 12.

For leading off from the feed chamber 4 any gases accompanying the whole milk, there is a pipe 13 projecting into the spindle 2 and fitted with a cock 14 which, if required, may be replaced by an automatic valve letting through gases but not liquid. Alternatively, or additionally, a gas escape channel 15 from the chamber 7 may be provided.

What I claim and desire to protect by Letters Patent is:

1. The method of effecting clean centrifugal separation of cream from milk which comprises feeding the whole milk, through an axial channel rotating with an annular separating chamber, in a solid stream directly into the bottom thereof, outflowing all the cream separated in the separating chamber from the top thereof into a separate paring chamber at such small radial distance from the axis of rotation as will maintain the bowl completely full of liquid, withdrawing cream from the paring chamber through a stationary channel, and maintaining the liquid level in the paring chamber at a radial distance from the axis of rotation substantially greater than the distance from such axis of the radius of outflow of cream from the separating chamber.

2. The method of effecting clean centrifugal separation of cream from milk which comprises feeding the whole milk, through an axial channel rotating with an annular separating chamber, in a solid stream directly into the bottom thereof, outflowing all the cream separated in the separating chamber from the top thereof into a separate paring chamber at such small radial distance from the axis of rotation as will maintain the bowl completely full of liquid, outflowing the separated skim milk from the peripheral part of the separating chamber to a second paring chamber, withdrawing the two liquids from the paring chambers through stationary channels, and maintaining the liquid level in each paring chamber at a radial distance from the axis of rotation greater than the distance from such axis of the radius of outflow of cream from the separating chamber.

3. The process defined in claim 1 comprising withdrawing from the liquid, in the course of its flow from the source of supply to the locus of paring, any gas contained therein.

4. A centrifugal separator comprising an annular separating chamber spaced from the separator's axis of rotation, a feed channel rotating with the separating chamber and communicating direct with the bottom thereof and so positioned and dimensioned as to be completely filled with feed liquid, a paring chamber adapted to receive from the separating chamber the lighter separated liquid, a stationary parer through which the lighter separated liquid is adapted to be withdrawn from the paring chamber, and means constraining all the lighter separated liquid to outflow from the separating chamber into the paring chamber at a radial distance from the separator's axis of rotation not greater than the radial distance from such axis of the inner wall of the separating chamber, said parer extending radially so far outside the separator's axis and so far outside said lighter liquid outflow as to maintain in said paring chamber a liquid level at a radial distance from said axis substantially greater than the radial distance from such axis of the inner wall of the separating chamber and the lighter liquid outflow therefrom.

5. A centrifugal separator comprising an annular separating chamber spaced from the separator's axis of rotation, a feed channel rotating with the separating chamber and communicating direct with the bottom thereof and so positioned and dimensioned as to be completely filled with feed liquid, paring chambers adapted to receive from the separating chamber the separated liquids, stationary parers through which the separated liquids are adapted to be withdrawn from the paring chambers, and means constraining all the lighter separated liquid to outflow from the separating chamber into the paring chamber for lighter liquid at a radial distance from the separator's axis of rotation not greater than the radial distance from said axis of the inner wall of the separating chamber, said parers extending radially so far outside the separator's axis and so far outside said lighter liquid outflow as to maintain in said paring chambers liquid levels at radial distances from the said axis substantially greater than the radial distance from such axis of the inner wall of the separating chamber and the lighter liquid outflow therefrom.

6. In a centrifugal separator as defined in claim 4, the addition of one or more channels for escape of gas from the solid body of liquid flowing through said feed channel and separating chamber.

7. In a centrifugal separator as defined in claim 5, the addition of one or more channels for escape of gas from the solid body of liquid flowing through said feed channel and separating chamber.

8. A centrifugal separator as defined in claim 4 in which the feed channel is a hollow spindle supporting the bowl.

9. A centrifugal separator as defined in claim 5 in which the feed channel is a hollow spindle supporting the bowl.

10. A centrifugal separator comprising a bowl having a central core to thereby provide an annular separating chamber, a feed channel rotating with the separating chamber and communicating direct with the bottom thereof and so positioned and dimensioned as to be completely filled with feed liquid, means forming a parer chamber and including a lower wall above said core partitioning the parer chamber from the separating chamber, said wall having a central opening of a diameter at least as small as the diameter of said core and through which all the lighter liquid separated in the separating chamber is constrained to flow into said parer chamber, thereby maintaining the separating chamber completely filled with only liquid, a stationary parer through which the lighter separated liquid is adapted to be withdrawn from the paring chamber, said parer extending radially so far outside the edge of the central opening in said partitioning wall as to maintain in the paring chamber a liquid level at a radial distance from the bowl's axis substantially greater than the radial distance from said axis of the inner wall of the separating chamber and the edge of the opening in said partitioning wall.

ALF LENNART STIGEN.